US006893136B2

(12) United States Patent
Yang

(10) Patent No.: US 6,893,136 B2
(45) Date of Patent: May 17, 2005

(54) PANEL LIGHT SOURCE DEVICE AND BACK LIGHT MODULE FOR LIQUID CRYSTAL DISPLAY DEVICE

(75) Inventor: Kei Hsiung Yang, Taoyuan (TW)

(73) Assignee: Hannstar Display Corp., Taiwan (TW)

( * ) Notice: Subject to any disclaimer, the term of this patent is extended or adjusted under 35 U.S.C. 154(b) by 251 days.

(21) Appl. No.: 10/227,841

(22) Filed: Aug. 27, 2002

(65) Prior Publication Data

US 2004/0017675 A1 Jan. 29, 2004

(30) Foreign Application Priority Data

Jul. 26, 2002 (TW) ........................... 91117235 A

(51) Int. Cl.$^7$ ................................................. F21V 7/04
(52) U.S. Cl. ............................................. 362/31; 349/65
(58) Field of Search ............................... 362/31; 349/65

(56) References Cited

U.S. PATENT DOCUMENTS

| 5,477,422 A | 12/1995 | Hooker et al. |
| 5,485,354 A | 1/1996 | Ciupke et al. |
| 6,086,212 A | 7/2000 | Onishi et al. |
| 6,160,595 A * | 12/2000 | Kishimoto ............... 349/61 |
| 6,164,790 A | 12/2000 | Lee |
| 2002/0003593 A1 * | 1/2002 | Arakawa et al. ......... 349/65 |
| 2004/0080926 A1 * | 4/2004 | Chen et al. ............ 362/31 |

FOREIGN PATENT DOCUMENTS

| CN | 1327166 A | 12/2001 |
| JP | 63-168626 | 7/1988 |
| JP | 09-288211 | 11/1997 |
| TW | 118937 | 8/2000 |

* cited by examiner

Primary Examiner—Stephen Husar
Assistant Examiner—James W Cranson

(57) ABSTRACT

A panel light source device comprises a light source, a U-shaped reflector surrounding the light source, a light guide, and a plurality of metal grid wires. The light guide has an incoming surface facing the light source and an outgoing surface. The light is transmitted into the light guide from the incoming surface and then transmitted out of the light guide from the outgoing surface. The metal grid wires are disposed between the incoming surface and the light source for transmitting the light with a predetermined polarization therethrough and reflecting the rest light therefrom.

20 Claims, 6 Drawing Sheets

PANEL LIGHT SOURCE DEVICE AND BACK LIGHT MODULE FOR LIQUID CRYSTAL DISPLAY DEVICE

CROSS REFERENCE TO RELATED APPLICATION

This application claims the priority benefit of Taiwan application serial no. 091117235, filed Jul. 26, 2002, the full disclosure of which is incorporated herein by reference.

BACKGROUND OF THE INVENTION

1. Field of the Invention

The present invention generally relates to a panel light device, and more particularly, to a back light module for a liquid crystal display (LCD).

2. Description of the Related Art

Referring to FIG. 1, it depicts the structure of a conventional liquid crystal display. Generally, the liquid crystal display device includes a liquid crystal panel 10 which has two substrates and a liquid crystal material sealed therebetween, a back light unit 20 disposed under the liquid crystal panel 10, and cases 11 and 12.

The back light unit 20 is utilized to distribute the light from a light source uniformly over the surface of the liquid crystal panel 10. There are several kinds of back light units 20 such as a direct back light type (or direct type) and an edge light type.

Referring to FIG. 2, which is a cross-sectional view along line 2—2 of FIG. 1, it depicts a back light module 21 of the direct type. The direct type back light module 21 includes a housing 70 which has a reflective sheet 60 disposed on the bottom surface of the housing 70 and, a lamp 50, such as a fluorescence cathode tube, disposed at the bottom portion of the housing 70, a diffusing sheet 40 disposed on the upper surface of the housing 70 and a prism sheet 30 disposed on the diffusing sheet 40. Since the lamp 50 is spacedly disposed inside the display area of the liquid crystal panel 10, the brightness distribution of the liquid crystal panel may be not uniform. Also, the TFT (Thin Film Transistor) switching elements of the liquid crystal panel 10 may be damaged by the heat of the back light source.

Therefore, some distance or space between the lamp 50 and the diffusing sheet 40 is required. This distance or space is provided typically by means of supports 55 disposed in the housing 70. Because of these required structural elements, it is very difficult to reduce the thickness of the direct type back light module 21.

Referring to FIG. 3, which is a cross-sectional view along line 2—2 of FIG. 1, it depicts a back light module 22 of the edge light type. The edge light type back light module 22 includes a light guide 80, a lamp 50 which is attached to at least one edge of the light guide 80, and a U-shaped reflector 61 which surrounds the lamp 50. An open portion of the reflector 61 is disposed at the edge of the light guide 80, a reflecting sheet 60 is disposed at the bottom of the light guide 80, a diffusing sheet 40 is disposed on the light guide 80 and a prism sheet 30 is disposed on the diffusing sheet 40. Because the lamp 50 is disposed at the edge of the light guide 80, the thickness of the LCD can be relatively decreased.

The light guide 80 includes a printed dot pattern or a V-shaped notched pattern on at least one surface for scattering the light in the light guide 80 and illuminating the liquid crystal panel 10. The light guide 80 is typically made of PMMA by the process of press or ejection molding. The diffusing sheet 40 is disposed on the light guide 80 and typically made of half-transparent PET or polycarbonate for further evenly diffusing the light emitted from the light guide 80. The prism sheet 30 is disposed on the diffusing sheet 40 for gathering the diffused light from the diffusing sheet 40 in the direction perpendicular thereto.

Since the liquid crystal panel 10 has a polarizing sheet for transmitting the light with one polarizing direction and absorbing the light with the other polarizing direction, about 50% of the energy of the light is lost when the light passes the polarizing sheet. Therefore, a polarization recycle film 35 is typically disposed on the prism sheet 30 for reflecting the light with the other polarizing direction, and the reflected light then is reflected by the optical element therebeneath and recycled after the polarizing direction thereof is changed, thereby increasing the brightness of the liquid crystal display. However, the above-mentioned polarization recycle film is available typically from 3M™ Company of St. Paul Minn. under the trade name Dual Brightness Enhancement Film (DBEF), which causes the liquid crystal display up to 160–170% brighter, but is significantly expansive. Further, the cost of the liquid crystal display will increase more and more as the dimension of the liquid crystal display increases in recent years.

Accordingly, the back light module of the liquid crystal display shall be constructed to meet the requirements of increasing power efficiency and the screen brightness, providing uniform brightness, lowering power consumption and cost, as well as decreasing the dimension. Prior art attempts have been made to meet the requirements and, for example, can be seen in U.S. Pat. No. 6,164,790 issued to Lee on Dec. 26, 2000, U.S. Pat. No. 5,477,422 issued to Hooker et al. on Dec. 19, 1995, and U.S. Pat. No. 5,485,354 issued to Ciupke et al. on Jan. 16, 1996. These patents are all incorporated herein by reference. However, the back light modules in these patents and the other prior art still cannot meet the above-mentioned requirements.

Furthermore, U.S. Pat. No. 6,086,212 issued to Onishi et al. on Jul. 11, 2000 discloses a back light unit which comprises an output light modulator provided on the light guide and an input light modulator provided between the light source and the light guide. However, the structure of the back light unit is complex and the brightness of the liquid crystal panel still cannot be significantly increased.

Accordingly, there exists a need for a back light module of a liquid crystal display capable of meeting the above-mentioned requirements.

SUMMARY OF THE INVENTION

It is an object of the present invention to provide a panel light source device for providing the liquid crystal display with the polarized light so as to increase the energy efficiency of the panel light source and the brightness of the liquid crystal display.

It is another object of the present invention to provide a panel light source capable of being manufactured at low cost and increasing the energy efficiency of the panel light source.

In order to achieve the above objects, the present invention provides a panel light source device comprises a light source, a reflector surrounding the light source, a light guide, and a plurality of metal grid wires. The light guide has an incoming surface facing the light source and an outgoing surface. The light is transmitted into the light guide from the incoming surface and then transmitted out of the light guide from the outgoing surface. The metal grid wires are disposed between the incoming surface and the light source for transmitting the light with a predetermined polarization therethrough and reflecting the rest light therefrom.

According to another aspect of the present invention, the present invention provides a back light module for illuminating a liquid crystal display panel of a liquid crystal display. The back light module comprises a light source, a reflector surrounding the light source, a light guide and metal grid wires. The light guide has an incoming surface facing the light source, scattering elements, and an outgoing surface. The light emitted form the light source is transmitted into the light guide from the incoming surface, scattered by the scattering elements, and then transmitted out of the light guide from the outgoing surface. The metal grid wires is disposed between the incoming surface and the light source for transmitting the light with a predetermined polarization therethrough and reflecting the rest light therefrom. The liquid crystal display further comprises optical films disposed between the outgoing surface of the light guide and the liquid crystal panel.

Accordingly, the back light module or the panel light source according to the present invention includes a reflecting type polarizer and thus provides the polarized light without lowering the energy efficiency. Also, the polarized light may transmit through the polarizing film of the liquid crystal display to minimize the light absorbed by the polarizing film. Therefore, the back light module or the panel light source according to the present invention dispenses with the expensive optical film but still meets the requirements of increasing the entire power efficiency, increasing the brightness, and lowering the cost of the liquid crystal display.

BRIEF DESCRIPTION OF THE DRAWINGS

Other objects, advantages, and novel features of the invention will become more apparent from the following detailed description when taken in conjunction with the accompanying drawing.

DESCRIPTION OF THE PREFERRED EMBODIMENT

Figure 1:
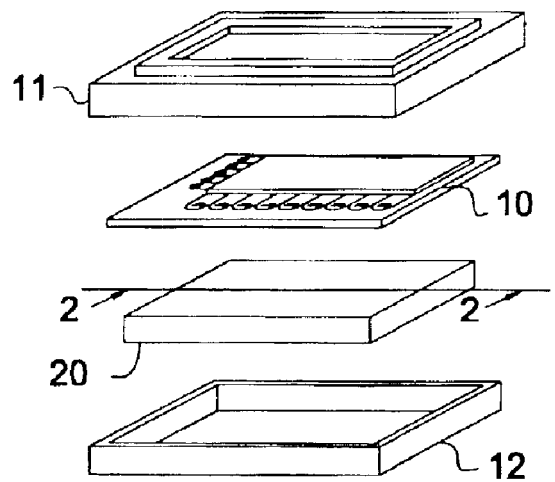
FIG. 1 is a perspective exploded schematic view of a liquid crystal display according to the prior art.
Figure 2:
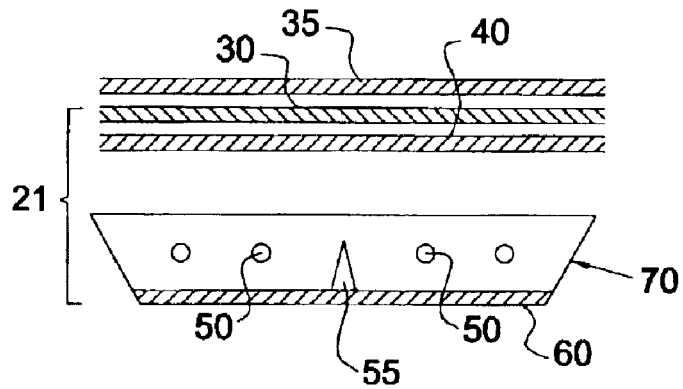
FIG. 2 is a cross sectional schematic view along line 2—2 of FIG. 1 of a direct type back light module according to the prior art.
Figure 3:
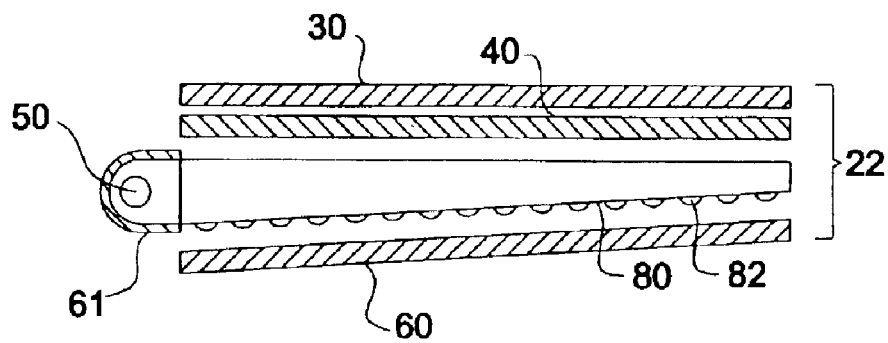
FIG. 3 is a cross sectional schematic view along line 2—2 of FIG. 1 of an edge light type back light module according to the prior art.
Figure 4:
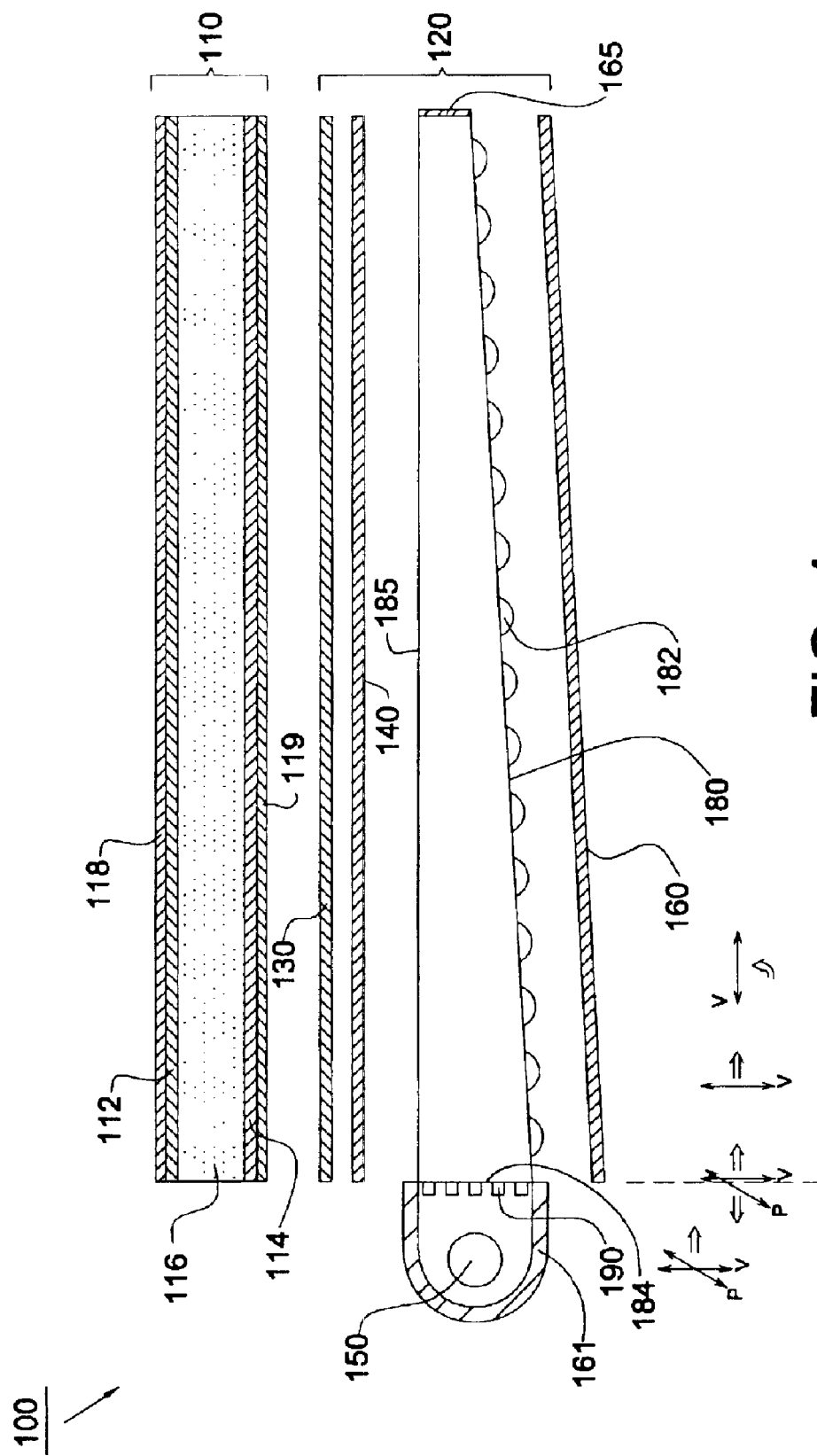
FIG. 4 is a cross sectional schematic view of a liquid crystal display according to the first embodiment of the present invention.

Referring to FIG. 4, it depicts a liquid crystal display 100 according to a first embodiment of the present invention.

The liquid crystal display 100 includes a liquid crystal panel 110 and a back light module 120. The liquid crystal panel 110 has two transparent substrates 112, 114 and a liquid crystal material 116 disposed therebetween. The outer surfaces of transparent substrates 112, 114 of the liquid crystal panel 110 are covered with polarizing sheet 118, 119, and the inner surfaces thereof are provided with switching elements for changing the alignments of the molecular of the liquid crystal material 116 and thus generating images.

The back light module 120 is served as a panel light device for illuminating the liquid crystal panel 110. The back light module 120 includes a light source 150, a U-shaped reflector 161 surrounding the light source 150, a wedge light guide 180 and a plurality of layers of optical films, such as diffusing sheet 140 and a prism sheet 130. The light source 150 can be a cold cathode fluorescent lamp; CCFL. The diffusing sheet is used for further evenly diffusing the light emitted from the light guide 80. The prism sheet 30 is commercially available from 3M™ Company of St. Paul Minn. under the trade name Brightness Enhancement Film II (BEF II) for gathering the light in the direction perpendicular thereto.

The light guide 180 is provided with scattering elements 182, such as a printed dot pattern or a V-shaped notched pattern on the bottom surface of the light guide 180, for scattering the light in the light guides 180 and transmitting the light out of the upper surface or the outgoing surface of the light guide 180 so as to serve as a uniform panel light source. The light guide 180 is typically made of PMMA by the process of press or ejection molding. The light guide 180 further comprises a reflector 165 disposed in the distal end of the light guide 180 for reflecting the light back to the light guide 180.

The incoming surface 184 of the light guide 180 further comprises metal grid wires 190. Now referring to FIG. 5, the metal grid wires 190 are spaced and formed directly on the incoming surface 184 such that the light with the polarizing direction perpendicular to the metal grid wires 190 transmits into the light guide 180 and the light with the polarizing direction parallel to the metal grid wires 190 is reflected. As shown in FIG. 4, the light emitted from the light source 150 is unpolarized light (random polarization), and consists of the component P, of which polarization is parallel to the metal grid wires 190, and the component V, of which polarization is perpendicular thereto. The parallel component P is reflected by the metal grid wires 190 and the perpendicular component V transmits into the light guide 180. Therefore, only the light with the polarizing direction perpendicular to the metal grid wires 190 (the perpendicular component V) transmits through the metal grid wires 190 into the light guide 180. The reflected light (the parallel component P) is then reflected by the reflector 161 and the polarization thereof is changed, and thereby transmitting through the metal grid wires 190 into the light guide 180. In the light guide 180, the polarizing light (the perpendicular component V) is scattered by the scattering elements 182 and transmits into the liquid crystal display panel 110. The polarization of the light which transmits into the liquid crystal display panel 110 is substantially perpendicular to the metal grid wires 190. Therefore, the light absorbed by the polarizing sheet 119 of the liquid crystal display panel 110 is decreased so the light efficiency of the liquid crystal display 100 is increased.

Figure 5:
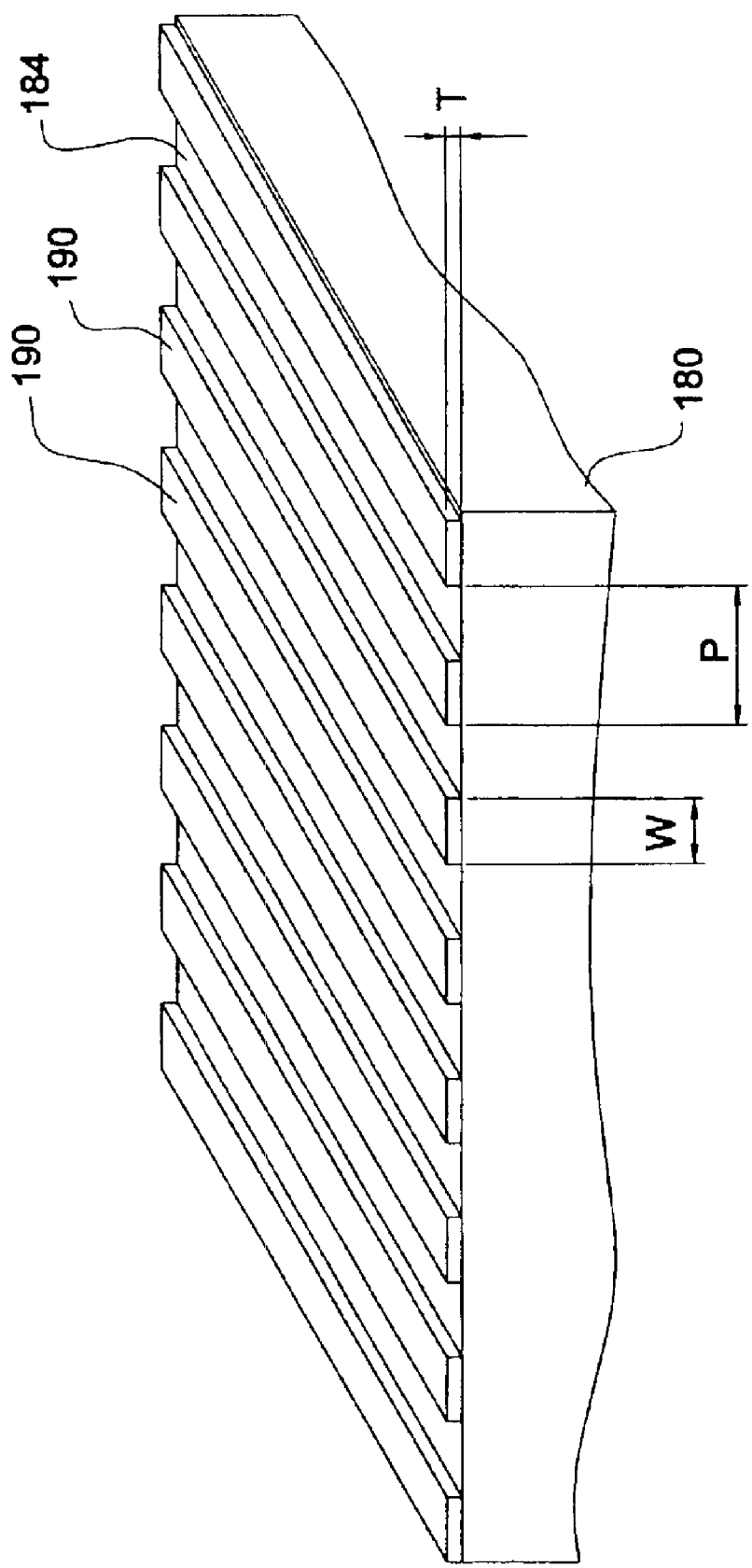
FIG. 5 is a partial enlarged perspective schematic view of an incoming surface of a light guide according to the first embodiment of the present invention.

According to the present invention, the metal grid wires 190 are made of aluminum, silver, copper or alloy, and preferably are made of aluminum. As shown in FIG. 5, preferably, the pitch P of the metal grid wires 190 is below about 300 nm, the thickness T of the metal grid wires 190 is in the range from about 30 nm to about 200 nm, and the ratio of the width W to the pitch P of the metal grid wires 190 is in the range from about 0.1 to about 0.8. It will be apparent to those skilled in the art that the metal grid wires 190 according to the present invention can also be formed on a substrate which is disposed between the light guide 180 and the light source 150.

It will be apparent to those skilled in the art that the metal grid wires 190 function as a polarizer of reflecting type (polarizing beam splitter) which reflects the light with the parallel polarizing direction and then the polarizing direction of the reflected light will be changed due to the reflection of the reflector 161 for transmitting through the metal grid wires such that the light efficacy of the liquid crystal display 100 is increased. Therefore, the other polarizer of reflecting type, such as cholesteric liquid crystalline polymer, cholesteric liquid crystalline polymer with a 1/4λ plate and the above mentioned DBEF manufactured by 3M™ company, can be used in place of the metal grid wires 190.

Obviously, it will be apparent to those skilled in the art that the polarizing direction of the polarizing sheet 119 on the liquid crystal panel 110 is corresponding to that of the reflecting type polarizer such that the brightness of the liquid crystal display 100 is increased. Generally speaking, because of the arrangement of the liquid crystal display, the back light module 120 according to the present invention is particularly adapted to be used with a thin film transistor (TFT) liquid crystal display panel of In-Plane-Switching, Vertical Alignment, and Multi-Domain Vertical Alignment.

Figure 6:
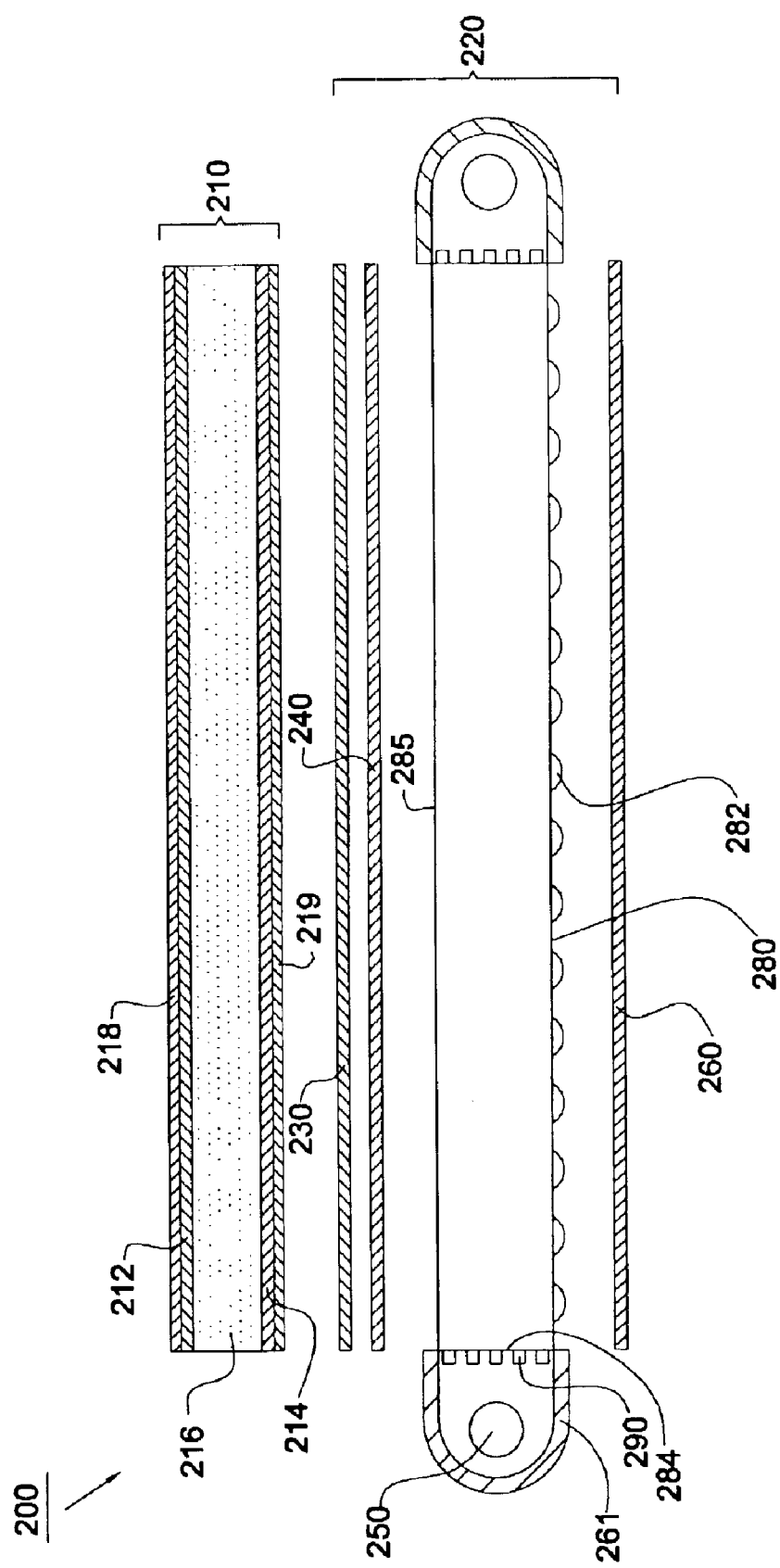
FIG. 6 is a sectional schematic view of a liquid crystal display according to the second embodiment of the present invention.

Now referring to FIG. 6, it depicts a liquid crystal display 200 according to the second embodiment of the present invention. The liquid crystal display 200 is generally similar to the liquid crystal display 100 wherein the similar elements are designated with the similar reference numerals. The liquid crystal display 200 comprises a back light module 220 having two light sources 250 respectively disposed on the opposite sides of the light guide 280. The light guide 280 is substantially cuboid and has two sets of metal grid wires 290 respectively disposed between the two light sources 250 and the sides of the light guide 280 for polarizing the incoming light. The function and principle of the liquid crystal display 200 is similar to that of the liquid crystal display 100 of the first embodiment and is not repeatedly described for the sake of simplicity and clarity.

Figure 7:
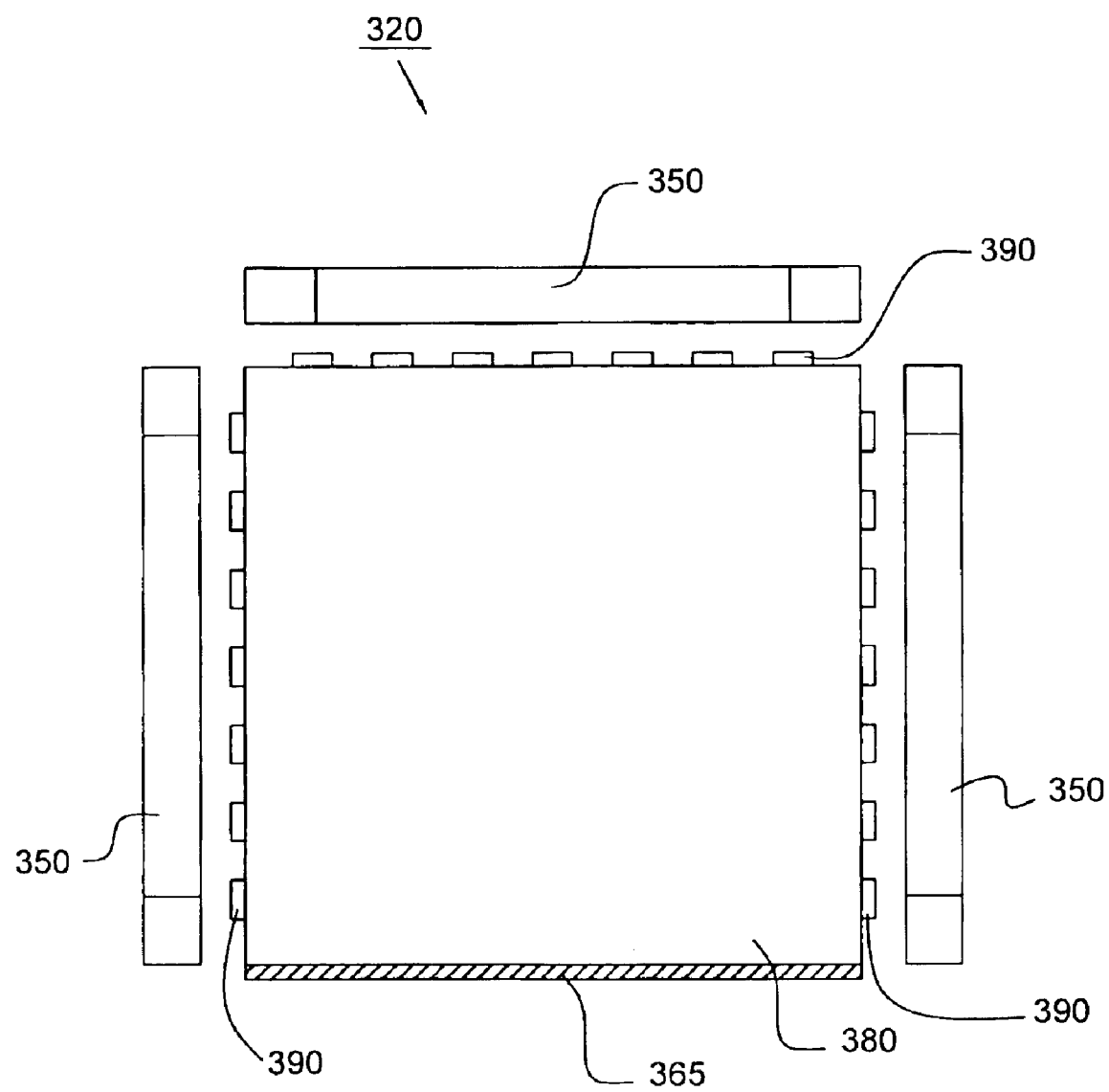
FIG. 7 is a sectional schematic view of a back light module according to the third embodiment of the present invention.

Now referring to FIG. 7, it depicts a back light module 320 according to the third embodiment of the present invention. The back light module 320 is generally similar to the back light module 220 wherein the similar elements are designated with the similar reference numerals. The back light module 320 has three light sources 350 respectively disposed on the three sides of the light guide 380. Between the three sides of the light guide 380 and the light sources 350 are the metal grid wires 390 disposed. The function and principle of the back light module 320 is similar to that of the back light module 220 of the second embodiment and is not repeatedly described for the sake of simplicity and clarity.

Figure 8:
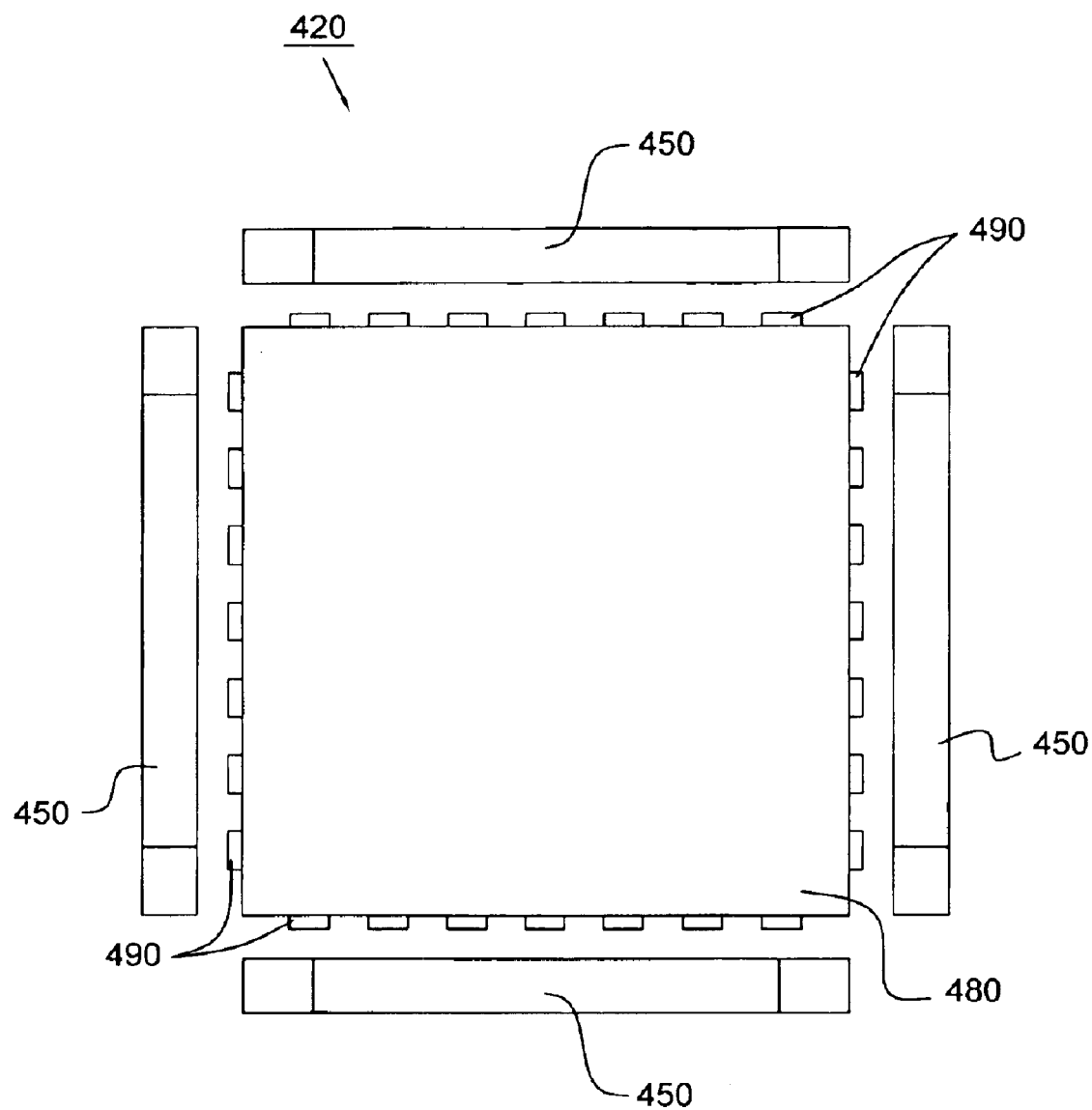
FIG. 8 is a sectional schematic view of a back light module according to the fourth embodiment of the present invention.

Now referring to FIG. 8, it depicts a back light module 420 according to the fourth embodiment of the present invention. The back-light module 420 is generally similar to the back light module 220 wherein the similar elements are designated with the similar reference numerals. The back light module 420 has four light sources 450 respectively disposed on the four sides of the light guide 480. Between the four sides of the light guide 480 and the light sources 450 are the metal grid wires 490 disposed. The function and principle of the back-light module 420 is similar to that of the back-light module 220 of the second embodiment and is not repeatedly described for the sake of simplicity and clarity.

As the foregoing description, the back light module or the panel light source according to the present invention provides the polarized light which may transmit through the polarizing film of the liquid crystal display to minimize the light absorbed by the polarizing film. Therefore, the back light module or the panel light source according to the present invention dispenses with the expensive optical film but still meets the requirements of increasing the entire power efficiency, increasing the brightness, and lowering the cost of the liquid crystal display.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A panel light source device comprising:
   a light source;
   a light guide having an incoming surface facing the light source and an outgoing surface, wherein the light is transmitted into the light guide from the incoming surface and then transmitted out of the light guide from the outgoing surface; and
   a plurality of metal grid wires disposed between the incoming surface and the light source for transmitting the light with a predetermined polarization therethrough and reflecting the rest light therefrom.

2. The panel light source device as claimed in claim 1, further comprising a reflector surrounding the light source.

3. The panel light source device as claimed in claim 1, wherein the light guide further comprises a plurality of scattering elements for scattering the incoming light and emitting the incoming light from the outgoing surface.

4. The panel light source device as claimed in claim 1, wherein the metal grid wires are made of aluminum.

5. The panel light source device as claimed in claim 1, wherein the metal grid wires are made of a material selected from the group consisting of aluminum, silver, copper and alloys and combinations thereof.

6. The panel light source device as claimed in claim 1, wherein the pitch of the metal grid wires is below about 300 nm.

7. The panel light source device as claimed in claim 1, wherein the metal grid wires have a thickness in a range of from about 30 nm to about 200 nm.

8. The panel light source device as claimed in claim 1, wherein the ratio of the width to the pitch of the metal grid wires is in a range of from about 0.1 to about 0.8.

9. The panel light source device as claimed in claim 1, wherein the metal grid wires are formed directly on the light guide.

10. A panel light source device comprising:
    a light source;
    a light guide having an incoming surface facing the light source and an outgoing surface, wherein the light is transmitted into the light guide from the incoming surface and then transmitted out of the light guide from the outgoing surface; and
    cholesteric liquid crystalline polymer with a ¼λ plate disposed between the incoming surface of the light guide and the light source for transmitting the light with a predetermined polarization therethrough and reflecting the rest light therefrom.

11. The panel light source device as claimed in claim 10, further comprising a reflector surrounding the light source.

12. The panel light source device as claimed in claim 10, wherein the light guide further comprises a plurality of scattering elements for scattering the incoming light and emitting the incoming light from the outgoing surface.

13. A liquid crystal display comprising:
   a liquid crystal display panel;
   a back light module for illuminating the liquid crystal display panel, which comprises:
      at least one light source;
      at least one reflector surrounding the light source;
      a light guide having at least one incoming surface facing the light source, a plurality of scattering elements, and an outgoing surface, wherein the light emitted form the light source is transmitted into the light guide from the incoming surface, scattered by the scattering elements, and then transmitted out of the light guide from the outgoing surface; and
      at least one set of metal grid wires disposed between the incoming surface and the light source for transmitting the light with a predetermined polarization therethrough and reflecting the rest light therefrom; and
   a plurality of optical films disposed between the outgoing surface of the light guide and the liquid crystal panel.

14. The liquid crystal display as claimed in claim 13, wherein the metal grid wires are made of aluminum.

15. The liquid crystal display as claimed in claim 13, wherein the metal grid wires are made of a material selected from the group consisting of aluminum, silver, copper and alloys and combinations thereof.

16. The liquid crystal display as claimed in claim 13, wherein the pitch of the metal grid wires is below about 300 nm.

17. The liquid crystal display as claimed in claim 13, wherein the metal grid wires have a thickness in a range of from about 30 mn to about 200 nm.

18. The liquid crystal display as claimed in claim 13, wherein the ratio of the width to the pitch of the metal grid wires is in a range of from about 0.1 to about 0.8

19. The liquid crystal display as claimed in claim 13, wherein the optical films comprises:
   at least one diffusing sheet for diffusing the light emitted form the light guide; and
   at least one prism sheet for gathering the light in the direction perpendicular thereto.

20. A liquid crystal display comprising:
   a liquid crystal display panel;
   a back light module for illuminating the liquid crystal display panel, which comprises:
      at least one light source;
      at least one reflector surrounding the light source
      a light guide having at least one incoming surface facing the light source, a plurality of scattering elements, and an outgoing surface, wherein the light emitted form the light source is transmitted into the light guide from the incoming surface, scattered by the scattering elements, and then transmitted out of the light guide from the outgoing surface; and
      cholesteric liquid crystalline polymer with a ¼λ plate disposed between the incoming surface and the light source for transmitting the light with a predetermined polarization therethrough and reflecting the rest light therefrom; and
   a plurality of optical films disposed between the outgoing surface of the light guide and the liquid crystal panel.

* * * * *